United States Patent [19]
Willie et al.

[11] Patent Number: 6,062,601
[45] Date of Patent: May 16, 2000

[54] MOTORIZED VEHICLE FUEL TANK PROTECTIVE DEVICE

[76] Inventors: Dale D. Willie; Tracy L. Steele, both of 680 Juniper St., Golden, Colo. 80401; Paul B. Miller, 11471 W. Hampden Pl., Lakewood, Colo. 80227

[21] Appl. No.: 09/352,221

[22] Filed: Jul. 13, 1999

[51] Int. Cl.$^7$ ........................................................ B60R 9/02
[52] U.S. Cl. .............................................. 280/770; 150/167
[58] Field of Search ..................................... 280/770, 830, 280/835, 834, 847; 180/219; 296/136; 150/167

[56] References Cited

U.S. PATENT DOCUMENTS

| | | |
|---|---|---|
| D. 385,232 | 10/1997 | Thurm . |
| 4,469,256 | 9/1984 | Mcewen . |
| 5,490,549 | 2/1996 | Biette . |
| 5,511,822 | 4/1996 | Wolanski . |
| 5,662,372 | 9/1997 | Lubkeman . |
| 5,791,718 | 8/1998 | Boutin . |
| 5,795,008 | 8/1998 | Allen . |
| 5,795,009 | 8/1998 | Sack et al. . |
| 5,820,200 | 10/1998 | Zubillaga et al. . |
| 5,884,380 | 3/1999 | Thurm . |

*Primary Examiner*—Brian L. Johnson
*Assistant Examiner*—G B Klebe
*Attorney, Agent, or Firm*—Timothy J. Martin; Michael R. Henson; Mark H. Weygandt

[57] ABSTRACT

An apparatus is disclosed for covering and protecting the forward surface of the fuel tank mounted to a motor vehicle. The protective device is adapted for a motorcycle framework, which may include a fork assembly in the vicinity of the mounted fuel tank. The apparatus has coverings, which may be flexible material, sized and adapted to cover the exposed areas of the forward surface of the fuel tank. The apparatus comprises several embodiments configured to cover different selected portions of the fuel tank with connecting assemblies to accommodate the motorcycle frame and fork assemblies where the fuel tank is attached. A first connecting assembly spans a portion of the forward surface of the fuel tank and interconnects the first and second cover portions when mounted to the tank. A second connecting assembly extends rearwardly from the covering sections to operatively engage a portion of the motorcycle. Each of the cover portions is generally triangular in shape having two linear sides and an arcuate side. Each cover portion preferably includes a flexible material such as a leather or vinyl panel, as well as an elastic member disposed on an edge of each cover portion. The connecting assemblies include a plurality of elastic straps having fasteners affixed thereto, such as filaform (hook and loop), hook and eye, or button snap fasteners. Where the motorized vehicle includes a fork assembly, the first connecting assembly connecting for the cover portions is used to stabilize the cover portions relative to the fork assembly by surrounding a portion of the fork assembly, and may be releasably securable and selectively adjustable and may further include a rigid member. The second connecting assembly extends rearwardly from the cover sections and engages and secures the covers to the vehicle framework and thereby also tensions, contours and secures the covers to the fuel tank forward surfaces.

29 Claims, 4 Drawing Sheets

MOTORIZED VEHICLE FUEL TANK PROTECTIVE DEVICE

FIELD OF THE INVENTION

The present invention generally relates to protective covers for motorized vehicles. More particularly, the present invention is directed to fuel tank protective covers for motorized vehicles, such as motorcycles. Specifically, the present invention concerns a protective device for covering and protecting a surface of a motorcycle fuel tank.

BACKGROUND OF THE INVENTION

Riding motorized vehicles, such as motorcycles, AWD vehicles, and small watercraft, is a popular form of transportation and entertainment. Families and friends often join together in the riding of such vehicles as leisure activity. Numerous groups and clubs have arisen which relate to the ownership and riding of motorized vehicles, and rallies and gatherings are held world-wide for owners of such vehicles.

One aspect of motorized vehicle ownership is the desire to present an attractive vehicle appearance. Numerous accessories and parts are sold for attachment and use with motorized vehicles to improve or change the appearance thereof. In particular, it is common for motorcycle owners to spend considerable effort and resources customizing one's motorcycle, thereby to present improved performance and a pleasing aesthetic appearance. An entire industry has developed around the appearance and customization of motorcycles, such as Harley-Davidson® motorcycles, a trademark of Harley-Davidson, Inc., 3700 W. Juneau Ave., Milwaukee, Wis. 53208.

In particular, it is often desirable to provide a motorcycle fuel tank having a unique shape and/or design painted thereon. Such fuel tanks present an attractive and distinct variation on a standard motorcycle, and may become associated with the designer thereof. Because of the great deal of effort and resources expended in customizing such fuel tanks, and because of the cost and effort required to repair either a customized or standard motorcycle fuel tank, it is desirable to protect the forward surface of the fuel tank to prevent damage thereto. When a motorcycle is ridden, damaging objects such as stones, gravel, dirt, etc. may impact the forward surface of the fuel tank thereby scratching the painted design or denting the surface structure of the tank. Even when the motorcycle is not in motion, persons or objects may touch against the surface of the tank thereby causing such damage thereto.

It is desirable, therefore, to protect the surface of the fuel tank. Such protection is desirable regardless of whether the tank is a standard fuel tank or a customized design, given the cost and effort necessary to repair damage caused to a fuel tank's surface. When a motorcycle fuel tank is damaged, replacement costs can become burdensome, and repair or replacement costs multiply if the tank is damaged frequently. Further, repair of a dent or paint chip on a motorcycle fuel tank can require significant time in a repair shop, during which time the motorcycle is unavailable for use by the owner. Accordingly, protection for the surface of a motorized vehicle can be extremely beneficial to an owner thereof by saving repair expenses and minimizing down time of the vehicle.

In addition, it is desirable that such protection for a fuel tank also be aesthetically pleasing, in light of the focus on aesthetic appearances generally presented by motorcycle owners to their vehicles. It is known to provide a covering, or "bra", for the forward portion of an automobile, such as a sports car. Such coverings, often formed of dark or black leather or vinyl, provide an attractive and sporty appearance to the automobile. These coverings also serve the purpose of protecting the forward surface from damage caused by impacting objects. Automobile bra designs, however, are not adaptable to motorcycles or other motorized vehicles given the considerable differences in the structures of these types of vehicles.

In particular, the forward fuel tank surface of some types of motorized vehicles include an indented or inwardly directed central portion, thereby to create an outer expanded surface to either side of the central portion. Such a fuel tank design is common on motorcycles such as Harley-Davidson® motorcycles. In addition, a support structure or fork assembly may be attached near or to the central portion of the fuel tank, thereby to impede the attachment of a cover across the forward surface of the fuel tank, making the covering or protecting of this surface difficult to accomplish.

There have been some attempts at covering the surface of an exposed fuel tank. U.S. Pat. No. 5,490,549 to Biette shows a fuel tank cover which covers the top and sides of the fuel tank of a motorcycle. Biette's fuel tank cover includes an upper panel, two side panels, and a forward panel which includes a recess adapted to fit the motorcycle frame. The fuel tank cover includes an outside surface formed of a material such as vinyl or leather, and an inner shell formed of cotton or flannel to prevent scratching of the fuel tank surface. The fuel tank cover of Biette is intended to fit over and temporarily cover the entire exposed surface of a fuel tank during repair or maintenance work on the motorcycle. The Biette cover, however, does not appear to be otherwise securable to a motorcycle, such that the cover would likely not remain in place on the fuel tank while the motorcycle is ridden.

U.S. Pat. No. 5,884,380 and U.S. Pat. No. Des. 385,232 to Thurm each show a motorcycle fuel tank cover which comprises a sheet of material adapted to cover a stock gas tank, thereby to modify the appearance of the size and shape of the tank. The cover is attachable to the fuel tank by the connectors and fasteners which secure the fuel tank in place on the motorcycle's support frame. Although the Thurm cover protects the fuel tank surface from damaging objects, it requires a degree of effort to remove the motorcycle's existing fasteners and connectors, to position the cover over the existing fuel tank while the existing fasteners and connectors are removed, and to reconnect the existing fasteners and connectors thereby to hold the cover and the fuel tank in place. Further, the Thurm cover is designed to entirely cover the fuel tank surface. If the motorcycle had already been equipped with a customized fuel tank, as discussed above, the Thurm cover would hide the existing shape and painted design of the fuel tank, for which considerable effort and resources had been expended.

U.S. Pat. No. 5,511,822 to Wolanski shows a tank pad, bra and/or skin that is manufactured from a magnetic sheet material thereby to be removably securable to a metallic motorcycle gas tank so as to protect the paint from abrasion and destructive elements. Installation of the Wolanski tank pad, however, requires that the user cut a magnetic sheet material to a desired shape and heat the material prior to engaging the pad with the fuel tank. This heating process is necessary to allow the magnetic material to conform to the contour of the fuel tank. These requirements may make installation of the pad difficult for some users. Further, the Wolanski tank pad is only useful with fuel tanks composed of a magnetically active metallic material, and would not be securable to fuel tanks composed of various types of resilient plastics, as are now becoming more common.

Accordingly, it can be seen that there remains a need to provide a new and improved motorized vehicle fuel tank protective device which is easily attachable to a fuel tank. In particular, there remains a need to provide a vehicle bra which is adapted for attachment to the forward portion of motorized vehicles, such as motorcycles, thereby to protect a forward surface thereof and provide an attractive appearance thereto. The present invention is directed to meeting these needs.

SUMMARY OF THE INVENTION

It is an object of the present invention to provide a new and useful protective device operative to cover and protect the forward surface of a motorized vehicle.

It is another object to provide a vehicle bra adapted to attach to a motorized vehicle such as a motorcycle.

It is yet another object to provide a protective device for a motorcycle fuel tank which provides a pleasing aesthetic appearance.

A still further object is to provide a fuel tank protective device which is simple to attach and remove from an exposed surface of a fuel tank.

Yet another object is to provide a protective device that is inexpensive and simple to manufacture.

According to the present invention, a protective device is provided which is adapted for use with a motorized vehicle, preferably a motorcycle, which has a support framework, which may include a fork assembly, and a fuel tank affixed relative to the support framework. The protective device is operative to protect a forward surface of the fuel tank from impacting objects, and includes first and second cover portions and first and second connecting assemblies, which may comprise a connecting apparatus. The first and second cover portions, which may be flexible coverings, are sized and adapted to cover exposed areas of the forward surface of the fuel tank when secured in a mounted state to the fuel tank. The first connecting assembly spans a portion of the forward surface of the fuel tank and interconnects the first and second cover portions in the mounted state. The second connecting assembly extends rearwardly from the first and second cover portions and is operative to engage a portion of the motorized vehicle in the mounted state. The second connecting assembly is thereby cooperative with the first connecting assembly to apply a tension force across the first and second cover portions in the mounted state so as to permit the first and second cover portions to contour to the exposed areas of the forward surface of the fuel tank.

It is preferred that each of the cover portions is generally triangular in shape, preferably having two linear sides and an arcuate side. Each cover portion preferably includes a flexible material such as a leather or vinyl panel, as well as an elastic member disposed on an edge of each cover portion.

The connecting assemblies preferably include a plurality of elastic straps having fasteners affixed thereto, such as filaform (hook and loop), hook and eye or button snap fasteners. An alternative embodiment includes a flexible material interconnecting the first and second cover portions and integral therewith. Where the motorized vehicle includes a fork assembly, the first connecting assembly is operative to stabilize the first and second cover portions relative to the fork assembly, preferably by surrounding a portion of the fork assembly. The first connecting assembly may be releasably securable and selectively adjustable, and may further include a rigid member, such as a metal tab, to further stabilize the device.

These and other objects of the present invention will become more readily appreciated and understood from a consideration of the following detailed description of the exemplary embodiment of the present invention when taken together with the accompanying drawings, in which:

DETAILED DESCRIPTION OF THE EXEMPLARY EMBODIMENTS

The present invention is directed to a motorcycle fuel tank protective device. In particular, the present invention provides a motorcycle "bra", similar to an automobile bra, which engages a forward surface of a fuel tank thereby to protect the fuel tank surface and additionally provide an aesthetically pleasing look to the motorcycle. The present invention is particularly adapted for use with Harley-Davidson® motorcycles, although embodiments are contemplated which adapt to various styles of fuel tanks of various types of motorized vehicles.

Figure 1:
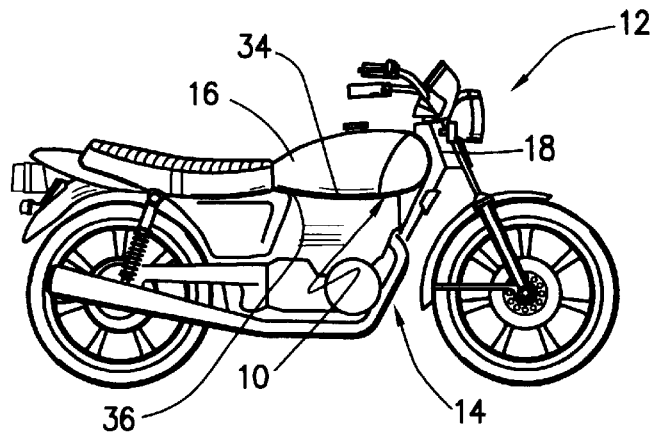
FIG. 1 is a side view in elevation of the protective device of the present invention shown in a mounted state on a motorcycle.

With reference to FIG. 1, then, a protective device 10 is shown mounted on a motorcycle 12 that has a support framework 14 and a fuel tank 16 affixed relative to the support framework 14. Support framework 14 also includes a fork assembly 18 adjacent fuel tank 16. The protective device 10 is secured to motorcycle 12 in a mounted state so that protective device 10 is operative to protect a forward surface of the fuel tank 16 from impacting objects.

Figure 2:
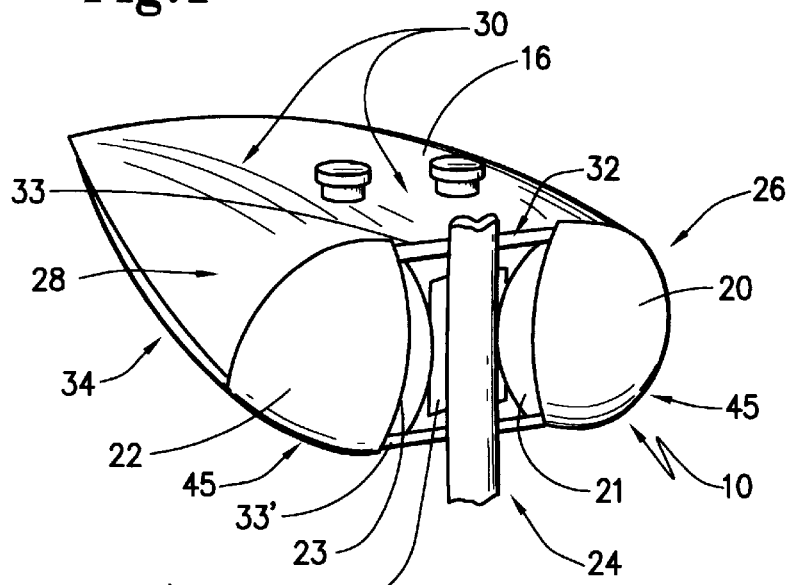
FIG. 2 is a front perspective view of a first embodiment of the present invention shown in a mounted state on a motorcycle fuel tank.

As can be seen with reference to FIG. 2, protective device 10 includes first cover portion 20 and second cover portion 22. First and second cover portions 20 and 22 are each formed of a flexible material and are sized and adapted to cover first and second exposed areas, 21 and 23 respectively, of the forward surface of fuel tank 16. It should be noted that FIG. 2 shows fuel tank 16 as the Harley-Davidson® type double tank. This type of tank includes an indented or inwardly extending central front portion 24 and forwardly bulbous left and right side portions 26 and 28, respectively.

As can further be seen in FIG. 2, cover portions 20 and 22 contour to respective first and second exposed areas 21 and 23, respectively, when protecting device 10 is in the mounted state on fuel tank 16. A connecting apparatus 30 is operative to maintain the first and second coverings 20 and 22 in the mounted state relative to fuel tank 16. Connecting apparatus 30 includes a first connecting assembly 32 and a second connecting assembly 34.

First connecting assembly 32 spans a portion of the forward surface of the fuel tank 16 and interconnects cover portions 20 and 22. Here, first connecting assembly 32 includes two straps 33 and 33'. Preferably, straps 33 and 33' are formed of an elastic material. Although straps 33 and 33' are shown directly connecting cover portions 20 and 22, it should be understood that indirect interconnections are also contemplated, such as where cover portions 20 and 22 are each respectively connected to fork assembly 18 by first connecting assembly 32. First connecting assembly 32, for example, may be releasably secured relative to the fork assembly 18. In any event, first connecting assembly 32 is operative to stabilize first and second cover portions 20 and 22 in the mounted stated relative to the fork assembly 18. Here, first connecting assembly 32 surrounds a portion of fork assembly 18, thereby to provide stabilization of cover portions 20 and 22.

With reference to FIGS. 1 and 2, it can be seen that second connecting assembly 34 extends rearwardly from cover portions 20 and 22 and engages a portion 36 of motorcycle 12 when in the mounted state. When protective device 10 is thus mounted on motorcycle 12, second connecting assembly 34 is cooperative with first connecting assembly 32 to apply a tension force across cover portions 20 and 22 thereby to permit cover portions 20 and 22 to conform to the contours of exposed areas 21 and 23, respectively.

Figure 3:
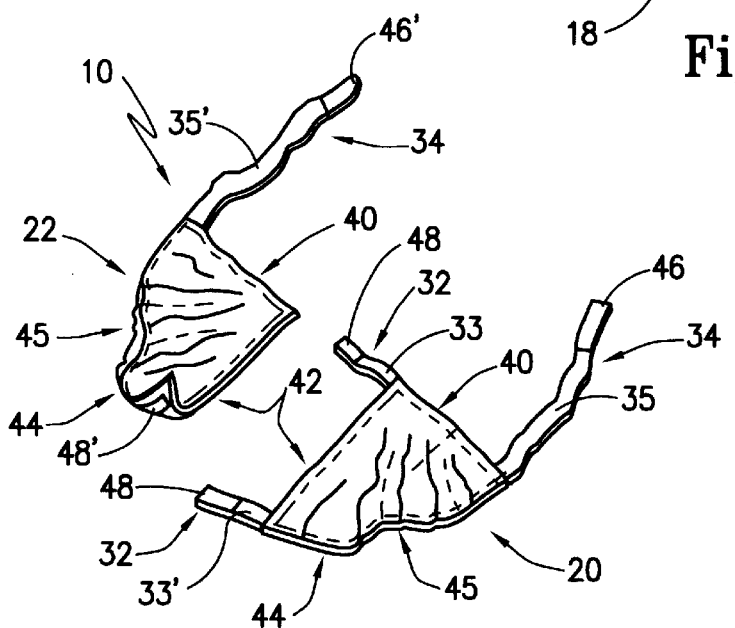
FIG. 3 is a top perspective view of the protective device shown in an unattached and unmounted state.

Turning to FIG. 3, it can be seen that protective device 10 can be detached into two pieces each associated with cover portions 20 and 22, respectively. It can further be seen that in the unmounted state cover portions 20 and 22 are each generally triangular in shape. In particular, each of cover portions 20 and 22 include two generally linear sides 40 and 42, and a generally arcuate side 44. Preferably, cover portions 20 and 22 are formed of a flexible material, and it is further preferred that the flexible material includes a panel formed of leather or vinyl.

It is also preferred that each of cover portions 20 and 22 include an elastic member disposed on an edge of the cover portion. Preferably, the elastic member is disposed along a central portion 45 of arcuate edge 44. As shown in FIG. 3, the elastic member causes cover portions 20 and 22 to form a gather along edge 44 when in the unattached state. However, as shown in FIG. 2, central portion 45 of arcuate edge 44 is allowed to expand when in the mounted state thereby to better conform to the contours of fuel tank 16.

Again with reference to FIG. 3, it may be seen that first connecting assembly 32 includes straps 33 and 33', and that second connecting assembly 34 includes straps 35 and 35'. Straps 33 and 33' are secured to cover portion 20 at spaced apart locations from one another. First connecting assembly 32 includes fasteners 48 and 48' disposed on the distal ends of straps 33 and 33', and fasteners 48' disposed on a portion of cover portion 22. Fasteners 48 and 48' are operative to removably secure first connecting assembly 32 to cover portion 22, thereby to releasably interconnect cover portions 20 and 22. It may be seen that first connecting assembly 32 may be selectively adjustable by varying the positions at which fastener 48 affixes to fastener 48'. The distal ends of straps 35 and 35' include fasteners 46 and 46' which are operative to secure straps 35 and 35' to one another. Preferably fasteners 46 and 46' are of the filaform or hook and loop variety, although other types of fasteners are contemplated, such as hook and eye or button snap-type fasteners.

Figure 4:
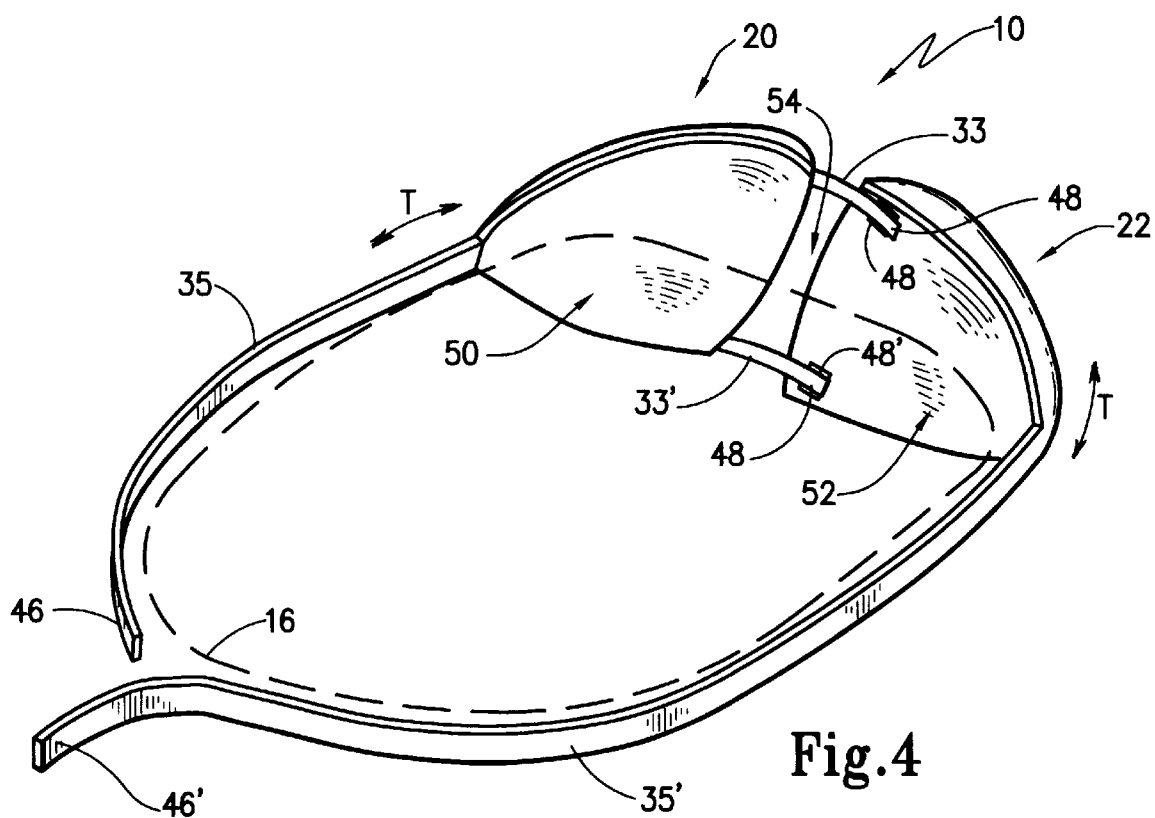
FIG. 4 shows a rear perspective view of the protective device mounted on a fuel tank, which is shown in phantom.

FIG. 4 shows a protective device 10 of the present invention in the attached and mounted state on the fuel tank 16 which is shown in phantom. Straps 33 and 33' span a forward portion of the fuel tank surface and interconnect cover portions 20 and 22 when fasteners 48 and 48' are fastened. Straps 33 and 33', together with cover portions 20 and 22 surround an opening 54 which is adapted to receive a portion of the fork assembly. Straps 35 and 35' extend rearwardly of cover portions 20 and 22 and can be connected by fastening fasteners 46 and 46'. As can be seen from FIG. 4, cover portions 20 and 22 contour to fuel tank 16 thereby to form cups 50 and 52, which are sized and adapted to receive a forward portion of fuel tank 16.

Straps 35 and 35' are cooperative with straps 33 and 33' to provide a tension force "T" across cover portions 20 and 22. This tension force allows cover portions 20 and 22 to contour to fuel tank 16, thereby forming cups 50 and 52.

Figure 5:
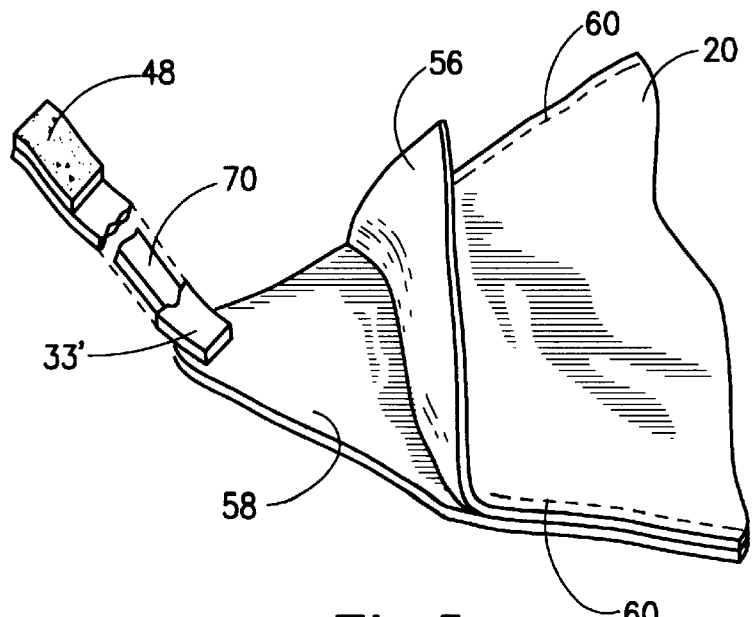
FIG. 5 is a perspective view of a corner of the protective device having a top layer thereof folded away to reveal a multi-layer construction.

FIG. 5 shows a two-layer construction of cover portion 20, although it should be understood that both single and multi-layer embodiments of the cover portions are contemplated. It should further be understood that cover portion 22 would be similarly formed as cover portion 20. Here, cover portion 20 is formed of an outer layer 56, which is preferably leather although it may be formed of other durable materials such as vinyl. Outer layer 56 is attached to inner layer 58 by stitching 60 along the edges of cover portion 20. Inner layer 58 is formed of a soft material such as cotton, flannel or chamois. Inner layer 58 is adjacent the motorcycle fuel tank in the mounted state, therefore it is preferred that inner layer 58 is non-abrasive so as to prevent scratching or paint chipping of the fuel tank.

Strap 33' is shown disposed on a corner of cover portion 20 attached in-between inner layer 58 and outer layer 56. Here, fastener 48 is shown as a separate portion of material disposed on a distal end of strap 33'. Fastener 48 may be attached by stitching, adhesive, or other means as understood by the ordinarily skilled artisan. Additionally, it should be understood that portions of first connecting assembly 32, such as strap 33', may further include rigid members disposed therein, such as metal tabs 70, which provide further support and stabilization of cover portions 20 and 22. Such rigid members also assist in extending first connecting assembly 32 around fork assembly 18 during mounting of protective device 10.

Figure 6:
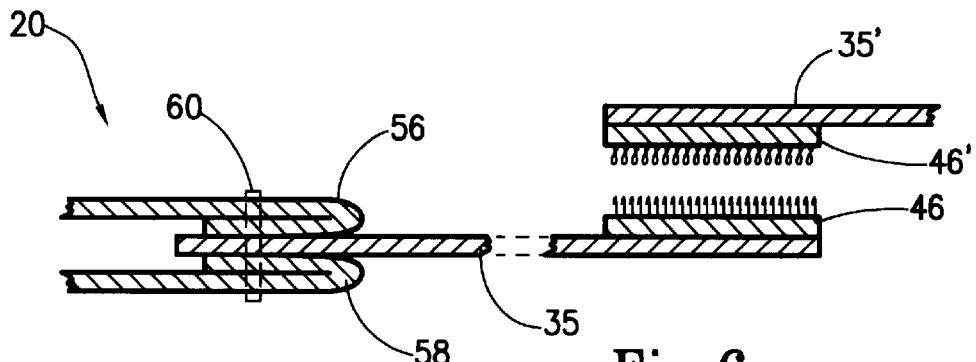
FIG. 6 is a side view in cross-section showing the attachment of a connecting strap to the protective device.

FIG. 6 shows the manner of attachment of strap 35 to cover portion 20 in cross-section. It should be understood that other straps such as 33, 33' and 35' may be similarly attached to cover portions 20 and 22, respectively. Here, outer layer 56 and inner layer 58 are folded inwardly at a margin along the edge of cover portion 20. Strap 35 is disposed between outer layer 56 and inner layer 58. Stitching 60 runs through outer layer 56, inner layer 58 and strap 35 thereby to seal the edge of cover portion 20 and to secure strap 35 to cover portion 20. Fasteners 46 and 46' on straps 35 and 35', respectively, are matable and are shown here as filaform hook and loop fasteners.

Figure 7:
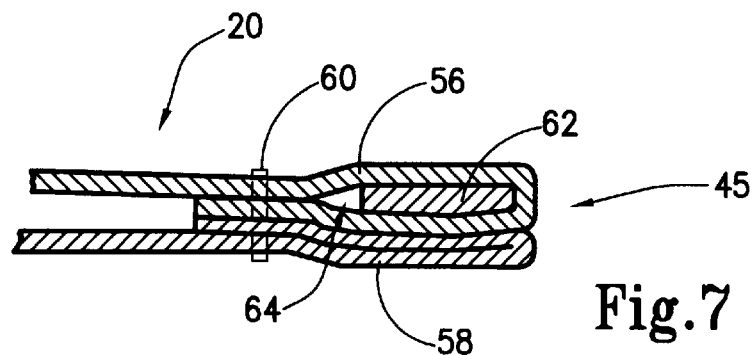
FIG. 7 is a side view in cross-section showing an elastic member sewn into an edge of the protective device.

FIG. 7 shows the central portion 45 of arcuate side 44, wherein an elastic member 62 is disposed. Here, inner layer 58 is folded at a margin along the edge of cover portion 20. Outer layer 56 is similarly folded and encases elastic member 62, such as an elastic strap or band. Stitching 60 which runs through outer layer 56 and inner layer 58 is operative to secure inner layer 58 to outer layer 56, and to retain elastic member 62 in the pocket 64 formed by folding outer layer 56. It should be understood that cover portion 22 is similarly formed to retain an elastic member 62. Further, additional stitching may be disposed through elastic member 62 and outer layer 56 and/or inner layer 58 thereby to retain elastic member 62 along central portion 45.

Figure 8:
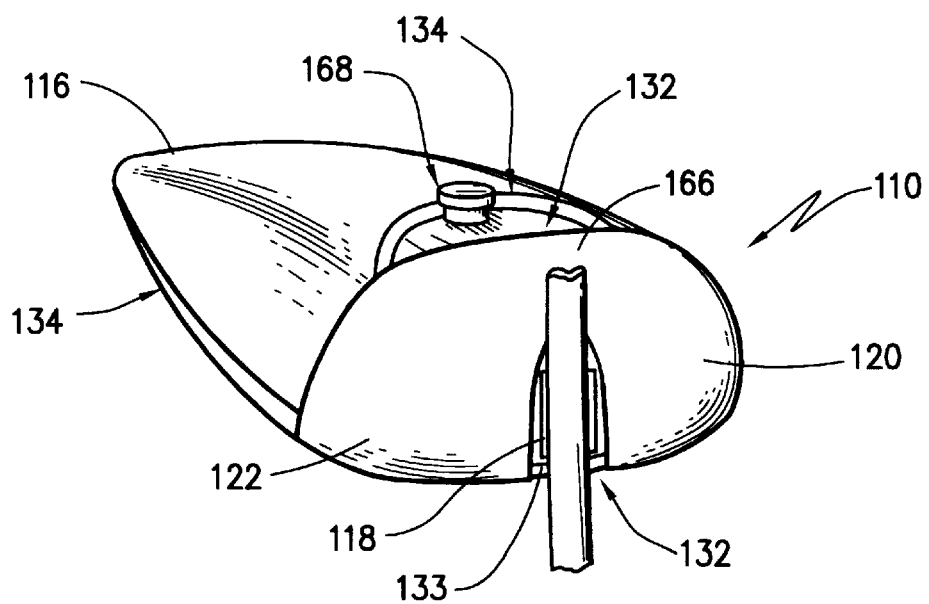
FIG. 8 is a front perspective view of a second embodiment of a protective device according to the present invention.

FIG. 8 shows a second embodiment of the protective device according to the present invention. Here, protective device 110 includes first cover portion 120 and second cover portion 122 which are interconnected by a portion of flexible material 166 and a strap 133, which together make up a first connecting assembly 132. First connecting assembly 132 surrounds fork assembly 118. Second connecting assembly 134 extends rearwardly from first and second cover portions 120 and 122. Here, a portion of second connecting assembly 134 engages fuel spout 168 of fuel tank 116. Here, fuel tank 116 is of the standard ovoid fuel tank type, which is generally rounded on the forward surface.

Figure 9:
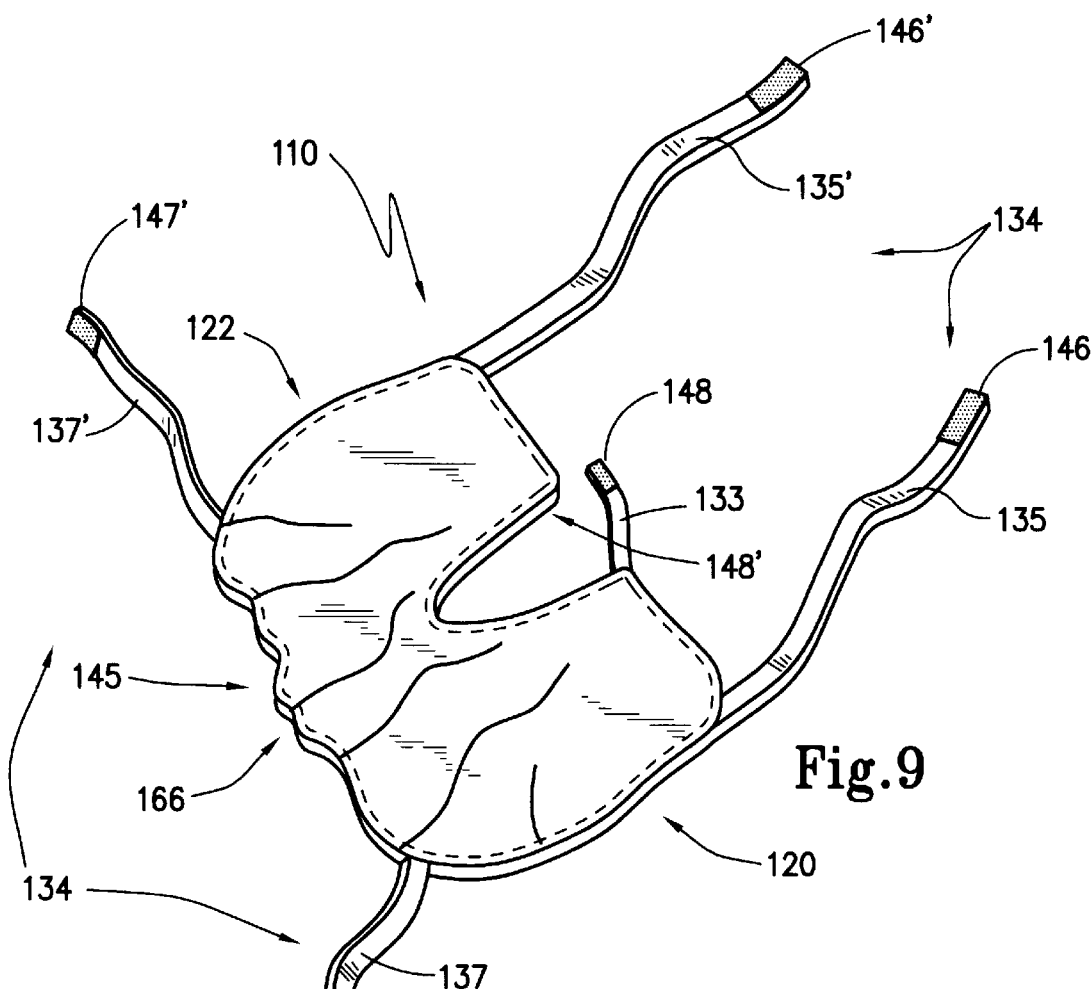
FIG. 9 is a top perspective view of the protective device of FIG. 8 shown in an unattached and unmounted state.

As shown in FIG. 9, cover portions 120 and 122 may be formed as an integral one-piece construction with portion of flexible material 166. Cover portions 120 and 122, along with portion of flexible material 166, may be formed as a multi-layer construction, such as with a first layer of a durable material such as leather or vinyl and with a second layer of a non-abrasive material such as cotton, flannel or chamois. It should again be understood, however, that a single layer construction is contemplated such as where the cover portions are formed of a single layer of the durable material. Strap 133 extends between cover portions 120 and 122. Here, strap 133 is secured to cover portion 120 and includes fastener 148 which affixes to fastener 148' disposed on cover portion 122. A portion of flexible material 166 may include an elastic member to allow edge 145 to stretch and contract, thereby to allow cover portions 120 and 122 to contour to fuel tank 116. In the unattached state, the elastic member contracts thereby causing bunching of edge 145 as shown in FIG. 9.

Second connecting assembly 134 here includes four straps disposed at spaced apart locations around protective device 110. In particular, straps 135 and 135' are secured to cover portions 120 and 122, respectively, and include fasteners 146 and 146' disposed on the distal ends of straps 135 and 135'. Fasteners 146 and 146' are operative to secure straps 135 and 135' to one another. Straps 137 and 137' are similarly secured to cover portions 120 and 122 at a spaced apart location from straps 135 and 135'. Straps 137 and 137' include fasteners 147 and 147' which are operative to secure strap 137 and 137' together. Again, it should be understood that the fasteners may be of a variety of types as understood by the ordinarily skilled artisan, such as filaform, hook and eye and button snap fasteners.

Figure 10:
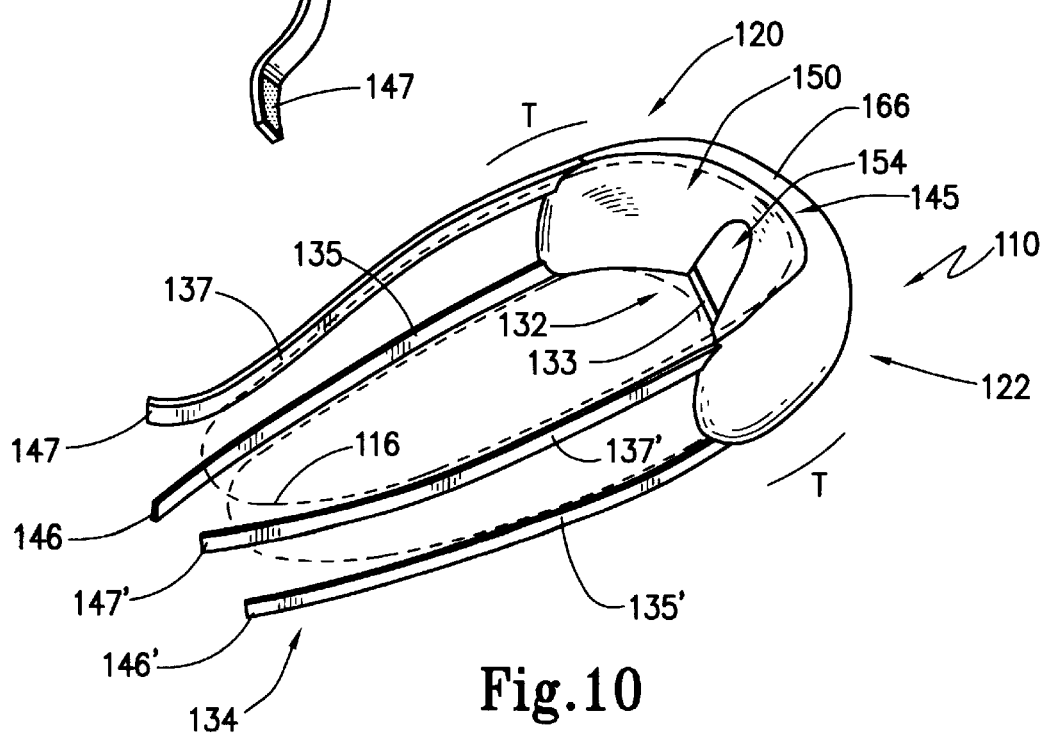
FIG. 10 is a rear perspective view showing the second embodiment of the protective device mounted on a fuel tank, which is shown in phantom.

As shown in FIG. 10, protective device 110 mounts on fuel tank 116 shown in phantom. Here, second connecting assembly 134 extends rearwardly from cover portions 120 and 122. Straps 135 and 135' are secured by fasteners 146 and 146', while straps 137 and 137' are secured by fasteners 147 and 147'. Strap 133 and portion of flexible material 166 interconnect cover portions 120 and 122, thereby to form opening 154 which is sized and adapted to receive fork assembly 118. First connecting assembly 132 is cooperative with second connecting assembly 134 to provide a tension force "T" across cover portions 120 and 122. When tension force "T" is applied, edge 145 containing an elastic member is stretched around fuel tank 116, thereby to form cup 150 which is sized and adapted to receive the forward portion of fuel tank 116.

It should be understood from the foregoing that the present invention contemplates variations on the type and manner of connecting assemblies and on the types of fasteners used therein. In addition, it should be understood that the present invention contemplates various shapes of the first and second cover portions, which may be adapted to fit various types of motorized vehicle fuel tanks as desired.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. A protective device adapted for use with a motorized vehicle that has a support framework and a fuel tank affixed relative thereto, wherein said protective device is operative to protect a forward surface of the fuel tank from impacting objects, comprising:

(a) first and second cover portions, each said first and second cover portion being sized and adapted to respectively cover first and second exposed areas of the forward surface when secured in a mounted state to the fuel tank;

(b) a first connecting assembly spanning a portion of the forward surface of the fuel tank and interconnecting said first and second cover portions in the mounted state; and (c) a second connecting assembly extending rearwardly from said first and second cover portions and operative to engage a portion of the motorized vehicle in the mounted state, whereby said second connecting assembly is cooperative with said first connecting assembly to apply a tension force across said first and second cover portions in the mounted state thereby to permit said first and second cover portions to contour to said respective first and second exposed areas of the forward surface.

2. A protective device according to claim 1 wherein each said first and second cover portion is generally triangular in shape.

3. A protective device according to claim 2 wherein each said first and second cover portion includes two generally linear sides and a generally arcuate side.

4. A protective device according to claim 1 wherein each said first and second cover portion is formed of a flexible material.

5. A protective device according to claim 4 wherein said flexible material includes a panel formed from a material selected from the group consisting of leather and vinyl.

6. A protective device according to claim 4 wherein each said first and second cover portion includes an elastic member disposed on an edge thereof.

7. A protective device according to claim 1 wherein said first connecting assembly includes a first strap secured to said first and second cover portions.

8. A protective device according to claim 7 wherein said strap is formed of an elastic material.

9. A protective device according to claim 7 wherein said first strap is removably secured to one of said first and second cover portions by a fastener.

10. A protective device according to claim 9 wherein said fastener is selected from a group consisting of filaform, hook and eye, and button snap fasteners.

11. A protective device according to claim 7 wherein said first connecting assembly further includes a portion of flexible material interconnecting said first and second cover portions and integral therewith.

12. A protective device according to claim 7 wherein said first connecting assembly further includes a second strap secured to said first and second cover portions at a spaced apart location from said first strap.

13. A protective device according to claim 1 wherein said second connecting assembly includes a strap extending rearwardly from one of said first and second cover portions, whereby said strap is operative to engage a portion of the motorized vehicle in the mounted state.

14. A protective device adapted for use with a motorized vehicle that has a support framework including a fork assembly and a fuel tank affixed relative thereto, wherein said protective device is operative to protect a forward surface of the fuel tank from impacting objects, comprising:

(a) first and second cover portions, each said first and second cover portion sized and adapted to respectively cover first and second exposed areas of the forward surface when secured in a mounted state to the fuel tank;

(b) a first connecting assembly associated with said first and second cover portions and operative to stabilize said first and second cover portions in the mounted state relative to the fork assembly; and (c) a second connecting assembly extending rearwardly from said first and second cover portions in the mounted state and operative to engage a portion of the motorized vehicle thereby to retain said protecting device in the mounted state.

15. A protective device according to claim 14 wherein said first connecting assembly surrounds a portion of the fork assembly.

16. A protective device according to claim 14 wherein said first connecting assembly is selectively adjustable.

17. A protective device according to claim 14 wherein a portion of said first connecting assembly is releasably secured relative to the fork assembly.

18. A protective device according to claim 14 wherein a portion of said first connecting assembly engages the fork assembly.

19. A protective device according to claim 14 wherein a portion of said first connecting assembly includes a rigid member disposed therein.

20. A protective device according to claim 19 wherein said rigid member is composed of metal and wherein said rigid member is disposed in a strap interconnecting said first and second cover portions.

21. A protective device according to claim 14 wherein said second connecting assembly engages a portion of the support framework.

22. A protective device according to claim 14 wherein said second connecting assembly includes a pair of straps, each strap extending rearwardly from one of said first and second cover portions in the mounted state, and wherein said straps are releasably securable to one another whereby said straps engage a portion of the motorized vehicle.

23. A protective device adapted for use with a motorized vehicle that has a support framework including a fuel tank affixed relative thereto, wherein said protective device is operative to protect a forward surface of the fuel tank from impacting objects, comprising:

(a) a first flexible covering sized and adapted to cover a first area of the fuel tank surface;

(b) a second flexible covering sized and adapted to cover a second area of the fuel tank surface; and (c) a connecting apparatus operative to attach said first and second coverings in a mounted state relative to the fuel tank, said connecting apparatus including a first connecting assembly operative in the mounted state to position respective portions of said coverings relative to one another at a selected spaced apart distance across a front of the fuel tank surface, and a second connecting assembly adapted to engage said motorized vehicle and said flexible coverings, said second connecting assembly extending rearwardly alongside said fuel tank in the mounted state and operative with said first connecting assembly to apply tension to said flexible coverings so that said first and second coverings contour, respectively, to the first and second areas of the fuel tank surface.

24. A protective device according to claim 23 wherein each of said first and second flexible coverings include an elastic member disposed on an edge thereof, said elastic member operative to apply tension across a region of each of said first and second flexible coverings.

25. A protective device according to claim 23 wherein said connecting apparatus includes a portion of flexible material interconnecting said first and second cover portions and integral therewith.

26. A protective device according to claim 25 including an elastic member disposed on an edge of said portion of flexible material.

27. A protective device according to claim 23 wherein said connecting apparatus includes a plurality of straps disposed on said first and second flexible coverings.

28. A protective device according to claim 27 wherein said first connecting assembly includes a first pair of straps operative to interconnect said first and second flexible coverings across a front of the fuel tank surface, and wherein said second connecting assembly includes a second pair of straps extending rearwardly of said first and second flexible coverings and operative to engage a portion of said motorized vehicle.

29. A protective device according to claim 23 wherein said connecting apparatus engages a portion of the fuel tank.

* * * * *